United States Patent

Caillouet

[15] 3,640,453

[45] Feb. 8, 1972

[54] PORTABLE COMPUTER

[72] Inventor: James J. Caillouet, Raleigh, N.C.

[73] Assignee: American Imagination Corp., Raleigh, N.C.

[22] Filed: Nov. 10, 1969

[21] Appl. No.: 875,210

[52] U.S. Cl. ....................235/78, 235/61 J

[51] Int. Cl. ....................G04f 7/04

[58] Field of Search ....................235/61 J, 84, 78, 88

[56] References Cited

UNITED STATES PATENTS

| | | | |
|---|---|---|---|
| 2,725,194 | 11/1955 | Krauss | 235/84 |
| 2,772,052 | 11/1956 | Studebaker | 235/84 |
| 2,489,030 | 11/1949 | Herrick | 235/84 |
| 2,661,900 | 12/1953 | Pastorius | 235/61 X |
| 2,724,552 | 11/1955 | Sherwood | 235/78 |
| 3,314,602 | 4/1967 | Finkelstein | 235/61 |

FOREIGN PATENTS OR APPLICATIONS

| | | | |
|---|---|---|---|
| 524,682 | 12/1953 | Belgium | 235/61 |
| 560,258 | 7/1958 | Canada | 235/61 |
| 241,370 | 10/1925 | Great Britain | 235/61 |

*Primary Examiner*—Richard B. Wilkinson
*Assistant Examiner*—Stanley A. Wal
*Attorney*—Parrott, Bell, Seltzer, Park & Gibson

[57] ABSTRACT

A portable computer comprising a planar base member having a circular, logarithmically spaced scale thereon indicative of a first value and having an opening disposed therethrough, a circular disc rotatably mounted in superimposed relation on the base member and having a logarithmically spaced scale disposed on a front face thereof which is indicative of a second value. The circular disc also has a logarithmically spaced scale on the back face thereof in alignment with the opening through the base member and being indicative of a third value which is the quotient of the first and second values so that when the circular disc is rotated relative to the base member with a predetermined first value aligned with a predetermined second value, then the resulting third value will be aligned in the opening in the base member. Preferably, the computer also includes an additional logarithmically spaced scale and an equally spaced scale on the circular disc member and also includes a second circular disc member having a fixed indicator means and an equally spaced scale thereon for cooperating with the first disc member to compute additional values. The portable computer may be specifically constructed for use by a motorist and the above scales include units indicating various motorist's values.

14 Claims, 4 Drawing Figures

PATENTED FEB 8 1972

3,640,453

INVENTOR:
JAMES J. CAILLOUET

BY Parrott, Bell, Seltzer, Park & Gibson
ATTORNEYS

PORTABLE COMPUTER

This invention relates to portable computers and more particularly to a specific form of the portable computer for use by motorists in calculating various quantities to the operation of an automobile.

Various people from time to time, particularly including motorists or the like, desire to make computations that involve addition, subtraction, multiplication and division of values relating to a particular operation to which they are involved. Most of these computations can be done manually or mentally; however, manual or mental computing is both time consuming and subject to error.

While, heretofore, various devices have been suggested and provided for making various computations, these prior devices have not proven to be completely satisfactory for all such computations. Also, the prior devices have normally been limited in the functions and computations which they can perform and, therefore, if a number of difference computations were desired, multiple devices had to be used.

Accordingly, it is an object of this invention to provide an improved portable computer or calculator which will easily and uncomplicatedly provide numerous computations which may be desired.

It is a further more specific object of this invention to provide a portable computer, specifically constructed for use by a motorist in computing the various functions desired for evaluating the operation of an automobile.

By this invention, it has been found that the above objects may be accomplished by providing a portable computer comprising a substantially planar base member having opposed faces, one of the faces having a circular, logarithmically spaced scale thereon indicative of a first value, the base member also having an opening disposed therethrough inwardly of the first value scale and fixed indicator means on the other face in communication with the opening. The computer further comprises a circular disc having opposed faces and being rotatably mounted at the center thereof in superimposed relation on the base member concentrically of the first value scale and having a diameter less than that of the first value scale. The face of the circular disc facing the same direction as the one face of the base member has a circular, logarithmically spaced scale concentrically disposed thereon in the same ratio as the first value scale and being indicative of a second value. The circular disc also has a circular, logarithmically spaced scale disposed on the other face thereof in communicating relationship with the opening in the base member and being in the same ratio as the second scale and being indicative of a third value which is the quotient of the first value divided by the second value and arranged so that when the circular disc is rotated relative to the base member with a predetermined first value aligned with a predetermined second value, then the resulting third value will be aligned in the opening with the fixed indicator means.

Preferably, the scale on the base member is also indicative of a fourth value and the circular disc includes a circular, logarithmically spaced second scale concentrically disposed on the face thereof having the second value scale and being in the same ratio as the first value scale and being indicative of a fifth value and having an index so that when the circular disc is rotated relative to the base member with a predetermined first value aligned with a predetermined fifth value, then the resulting fourth value which is the quotient of the first value divided by the fifth value will be aligned with the index of the fifth value scale.

Also, preferably, the circular disc of the portable computer includes a circular, equally spaced third scale concentrically disposed on the face thereof having the first and second scales and being indicative of a sixth value. The portable computer further includes a second circular disc rotatably in superimposed relation on the first circular disc concentrically thereof. The second circular disc has a diameter less than that of the scales on the first circular disc and includes a fixed indicator means disposed thereon so that the second circular disc may be rotated relative to the first circular disc to align the fixed indicator means with the sixth value scale to preserve the last sixth value reading made. Also, the second circular disc preferably includes a circular, equally spaced scale concentrically disposed thereon and being in the same ratio as the distance reading scale and being indicative of a seventh value. The seventh value scale begins at the fixed indicator means and increases in the same direction as the sixth value scale on the first circular disc so that when the fixed indicator means is aligned with a first predetermined sixth value, then a seventh value representing the difference of the second and first sixth value will be aligned with the second sixth value.

A specific form of the invention of the present application is directed to the use of the above broadly described portable computer as a portable computer specifically designed for use by motorists. Accordingly, the broad description having been given above of the portable computer of this invention, the following more detailed description will be directed to the specific form of the portable computer for use by motorists While the specific motorists' form of portable computer is the only type illustrated in he accompanying drawings, it is to be understood that the broad aspects of the invention are as described above and could be used for computing various functions as well as the functions desired by a motorist.

Some of the objects of the invention having been stated, other objects will appear as the description proceeds, when taken in connection with the accompanying drawings, in which FIG. 1 is a front plan view of a portable computer of the present invention specifically constructed for use by a motorist;

Referring specifically to the various figures wherein like reference characters indicate like parts, there is illustrated a portable computer, generally indicated at 10, of the present invention specifically designed for use by a motorist.

The portable computer 10 comprises a substantially planar preferably circular, base member 12 and two dials or circular disc 14 and 16, with successively decreasing diameters, respectively. The base member 12 and circular disc 14 and 16 are concentrically mounted in superimposed relation as best illustrated in FIG. 4 for rotation about the centers thereof relative to each other by a rivet 18 or other suitable means.

Figure 1:
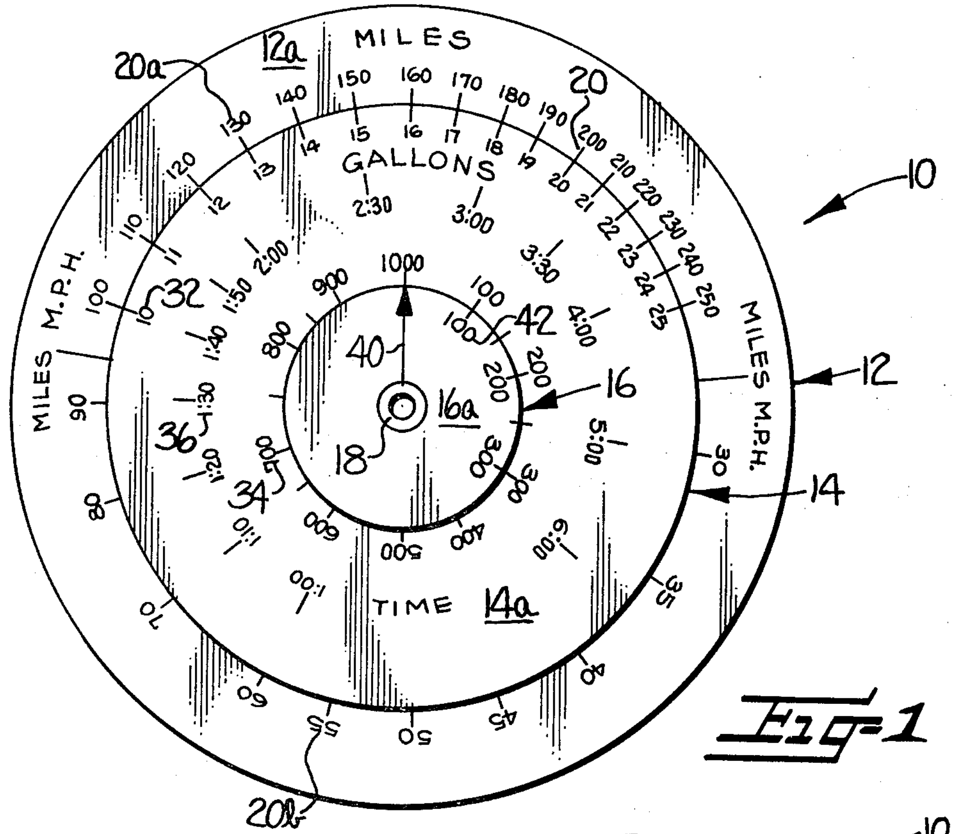

Circular base member 12 includes opposed faces **12*a* and 12*b*. With reference particularly to FIG. 1, face 12*a* has a circular, logarithmic scale 20 disposed thereon concentrically thereof. Scale 20 logarithmically progresses from 30 to 250 and is divided into portions 20*a* and 20*b* with portion 20*a* progressing from 30 to 90 and being indicative of both total distance traveled in units of miles and distance traveled per unit of time in units of miles per hour and portion 20*b* progressing from 100 to 250 and being indicative of total distance traveled in units of miles. If desired, scale 20 may be further subdivided and/or the scale expanded or contracted as desired to cover substantially any range. Inwardly of scale 20, the circular base member 12 has a generally rectangular opening 22 disposed therein, FIG. 2, and face 12*b* thereof has a fixed indicator such as an indicator arrow 24 thereon in communication with opening 22**.

Figures 2, 3, 4:
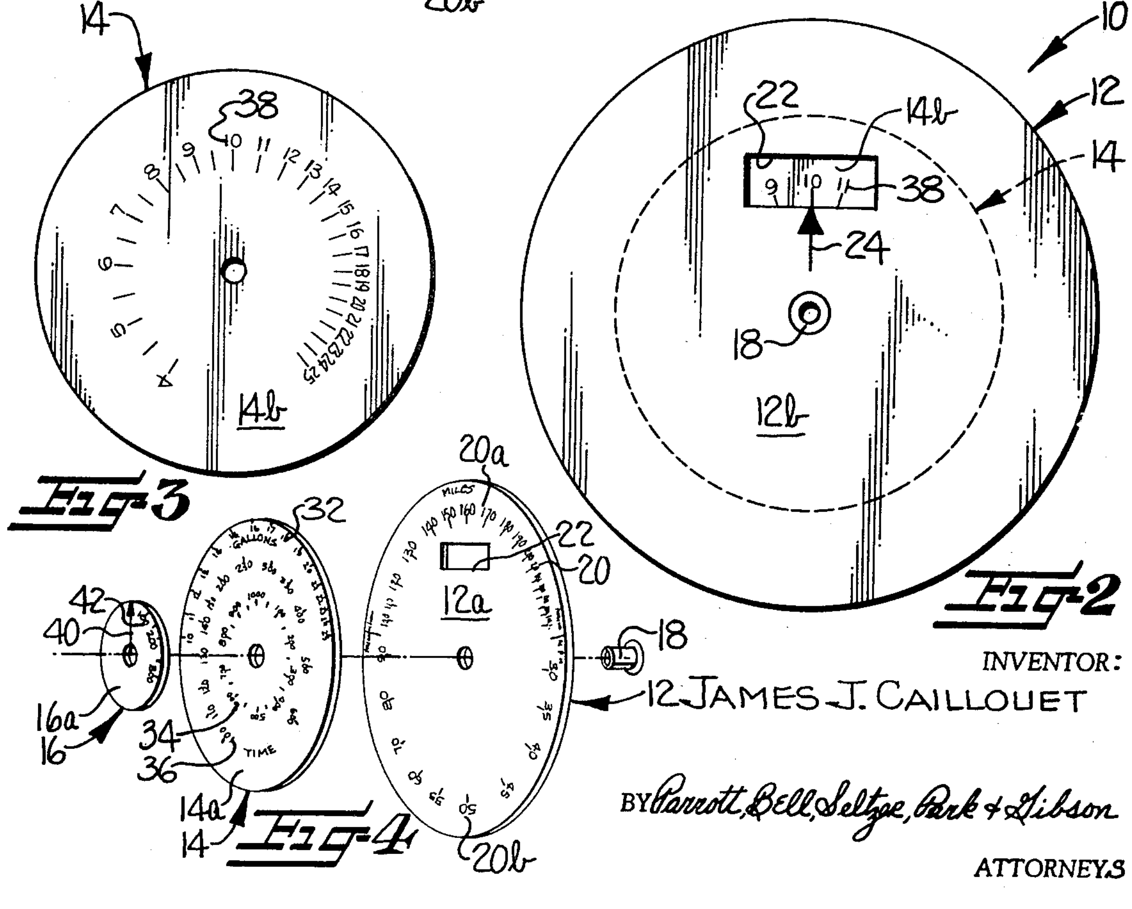
FIG. 2 is a reduced rear plan view of the portable computer of FIG. 1.
FIG. 3 is a reduced rear plan view of the intermediate superimposed circular disc of FIG. 1.
FIG. 4 is a reduced exploded perspective view of the portable computer of FIG. 1.

Circular disc 14, FIGS. 1 and 3, has opposite faces **14*a* and 14*b* and is superimposed on a circular base member 12 concentrically thereof and has a diameter less than that of scale 20 and preferably, substantially equal thereto. Face 14*a* which faces the same direction as face 12*a* of circular base member 12 includes an outer circular scale 32, an inner circular scale 34, and an intermediate circular scale 36 concentrically disposed thereon. Both scales 32 and 36 are logarithmic with scale 32 being indicative of total fuel consumed in units of gallons and logarithmically progressing from 10 to 25 in the same ratio as scale 20 and with scale 36 being indicative of time lapse in units of hours and logarithmically progressing from an index of 1 to 6 in the same ratio as scale 20. Scale 34** on the other hand is divided into equally spaced units and is indicative of distance reading in units of miles and linearly progresses from 0 to 1,000.

The other face **14*b* of circular disc 14, FIGS. 2 and 3, has a circular, logarithmic scale 38 concentrically disposed thereon in the same ratio as fuel consumption scale 32 and has a diameter such that it communicates with opening 22 of circular base member 12, FIG. 2, so that a portion thereof will be exposed through opening 22. Scale 38 logarithmically progresses from 4 to 25 and is indicative of distance traveled per unit of fuel consumed in units of miles per gallon with the values thereon arranged relative to the values on the fuel consumption scale 32 such that the value thereon aligned in opening 22 with indicator arrow 24 is the quotient of dividing the total distance traveled values of scale 20 by the total fuel consumption values of scale 32 that are aligned relative to each other. For instance, with portion 20*a* of scale 20 and scale 32 aligned as shown in FIG. 1, the quotient of dividing a value of scale 20 by the value aligned therewith on scale 32 is 10. With reference to FIG. 2, the value 10 on scale 38 is shown aligned in opening 22 with indicating arrow 24. Since portion 20*a* of scale 20 ranges from 100 to 250 and scale 32 ranges from 10 to 25, scale 38 which ranges from 4 to 25 covers the quotient of any alignment between portion 20*a* of scale 20 and scale 32 and allows the quotient to be read directly as the value aligned in opening 22 with indicator arrow 24** without any likelihood of confusion.

Circular disc 16, FIGS. 1 and 4, is superimposed on circular disc 14 concentrically thereof and has a diameter less than that of circular scale 34 and preferably substantially equal thereto to facilitate the use thereof. The face **16*a* of circular disc 16 includes a fixed indicator such as an indicator arrow 40 which is disposed radially thereof and communicates with the periphery thereof. A circular scale 42 is concentrically disposed on face 16*a* of circular disc 16 adjacent the periphery thereof. Scale 42 is divided into equally spaced units in the same ratio as scale 34 and is indicative of total distance traveled in units of miles and begins at zero where indicator arrow 40 communicates with the periphery of circular disc 16 and progresses therefrom in same direction as scale 34**.

In the operation or use of the portable computer 10, the motorist fills the vehicle fuel tank with fuel and notes the distance reading of the odometer or vehicle distance indicator. Suppose the odometer reads 1,000 miles, then the motorist rotates circular disc 16 so that the fixed indicator arrow 40 thereon is aligned with 1,000 miles on distance reading scale 34 as shown in FIG. 1. The portable computer 10, thus, has stored thereon the mileage reading when the fuel tank was last filled. The motorist then proceeds on his trip. The next time the motorist fills the fuel tank, he again notes the distance reading of the odometer.

Let us assume for purposes of illustration that the odometer now reads 1,200 miles. It will be noted that 1,200 is equivalent to 200 and the value 200 on scale 34 is aligned with 200 on scale 42. Thus, the motorist has traveled 200 miles between the filling of the fuel tank. While this illustration is quite simple, it can be seen that when the values are not so convenient, scale 34, indicator arrow 40 and scale 42 allow the determination of distance traveled without resort to manual calculations. If subsequent calculations are to be made, circular disc 16 would be rotated to align indicator arrow with 200 on scale 34, the present distance reading of the odometer.

Let us assume that 20 gallons of fuel were required to fill the fuel tank. To calculate the distance traveled per unit of fuel consumed, the motorist rotates circular disc 14 until 20 gallons on fuel consumed scale 32 is aligned with 200 miles on total distance traveled scale 20 as shown in FIG. 1. The portable computer 10 is then turned over and the value on distance traveled per unit of fuel consumed scale 38 aligned in opening 22 with indicating arrow 24 is the miles traveled per gallon of fuel consumed and as shown in FIG. 2 is 10 miles per gallon. It can be seen that the distance traveled per unit of fuel consumed is read directly from the portable computer 10 without any likelihood of confusion.

In addition, the motorist may calculate the average speed or average distance traveled per unit of time. For instance, let us assume that in traveling the 200 miles that approximately 3 hours and 15 minutes lapsed. The motorist rotates circular disc 14 until 3 hours and 15 minutes on time lapse scale 36 is aligned with 200 miles on total distance traveled scale 20 as shown in FIG. 1. The value on scale 20 is aligned with the index, 1, of time lapse scale 34 is the average miles per hour which in the present illustration is approximately 60 miles per hour.

While units of miles, gallons and hours have been employed, it will be noted that any other appropriate units may be employed. In addition, the various scales may be further divided and/or the various scales expanded or contracted as desired to cover substantially any ranges.

In the drawings and specifications, there has been set forth a preferred embodiment of the invention, and although specific terms are employed, they are used in a generic and descriptive sense only and not for purposes of limitation.

What is claimed is:

1. A portable computer comprising a substantially planar base member having opposed faces, one of said faces having a circular, logarithmically spaced scale thereon indicative of a first value, said base member also having an opening disposed therethrough inwardly of said first value scale and fixed indicator means on said other face in communication with said opening, a circular disc having opposed faces and being rotatably mounted at the center thereof in superimposed relation on said base member concentrically of said first value scale and having a diameter less than that of said first value scale, the face of said circular disc facing the same direction as said one face of said base member having a circular, logarithmically spaced scale concentrically disposed thereon in the same ratio as said first value scale and being indicative of a second value, said circular disc also having a circular, logarithmically spaced scale disposed on the other face thereof in communicating relationship with said opening in said base member, said last-named scale being in the same ratio as said second value scale and being indicative of a third value which is the quotient of said first value divided by said second value and arranged so that when said circular disc is rotated relative to said base member with a predetermined first value aligned with a predetermined second value then the resulting third value will be aligned in said opening with said fixed indicator means, and said scale on said base member also being indicative of a fourth value, and said circular disc including a circular, logarithmically spaced, second scale concentrically disposed on the face thereof having said second value scale and being in the same ratio as said first value scale and being indicative of a fifth value and having an index so that when said circular disc is rotated relative to said base member with a predetermined first value aligned with a predetermined fifth value then the resulting fourth value which is the quotient of said first value divided by said fifth value will be aligned with the index of said fifth value scale.

2. A portable computer as set forth in claim 1, wherein said circular disc includes a circular, equally spaced, third scale concentrically disposed on the face thereof having said first and second scales and being indicative of a sixth value, and further including indicator means rotatably attached at the center of said circular disc and cooperating with said sixth value scale so that said indicator means may be positioned relative to said sixth value scale to preserve the last sixth value reading made.

3. A portable computer, as set forth in claim 1 wherein said circular disc includes a circular, equally spaced, third scale concentrically disposed on the face thereof having said first and second scales and being indicative of a sixth value, and further including a second circular disc rotatably mounted in superimposed relation on said first circular disc concentrically thereof, said second circular disc having a diameter less than that of said scales on said first circular disc and including fixed indicator means disposed thereon so that said second circular disc may be rotated relative to said first circular disc to align said fixed indicator means with said sixth value scale to preserve the last sixth value reading made.

4. A portable computer, as set forth in claim 3, wherein said second circular disc includes a circular, equally spaced scale concentrically disposed thereon and being in the same ratio as said sixth value scale and bring indicative of a seventh value, said seventh value scale beginning at said fixed indicator means and increasing in the same direction as said sixth value scale on said first circular disc so that when said fixed indicator means is aligned with a first predetermined sixth value then a seventh value representing the difference of a second sixth value and the first sixth value reading will be aligned with the second sixth value.

5. A portable computer as set forth in claim 1, wherein said base member is circular.

6. A portable computer comprising a substantially planar base member having opposed faces, one of said faces having a circular, logarithmically spaced scale thereon indicative of a first value, said base member also having an opening disposed therethrough inwardly of said first value scale and fixed indicator means on said other face in communication with said opening, a circular disc having opposed faces and being rotatably mounted at the center thereof in superimposed relation on said base member concentrically of said first value scale and having a diameter less than that of said first value scale, the face of said circular disc facing the same direction as said one face of said base member having a circular, logarithmically spaced scale concentrically disposed thereon in the same ratio as said first value scale and being indicative of a second value, said circular disc also having a circular, logarithmically spaced scale disposed on the other face thereof in communicating relationship with said opening in said base member, said last-named scale being in the same ratio as said second value scale and being indicative of a third value which is the quotient of said first value divided by said second value and arranged so that when said circular disc is rotated relative to said base member with a predetermined first value aligned with a predetermined second value then the resulting third value will be aligned in said opening with said fixed indicator means, said scale on said base member also being indicative of a fourth value, and said circular disc including a circular logarithmically spaced, second scale concentrically disposed on the face thereof having said second value scale and being in the same ratio as said first value scale and being indicative of a fifth value and having an index so that when said circular disc is rotated relative to said base member with a predetermined first value aligned with a predetermined fifth value then the resulting fourth value which is the quotient of said first value divided by said fifth value will be aligned with the index of said fifth value scale, said circular disc further including a circular, equally spaced, third scale concentrically disposed on the face thereof having said first and second scales and being indicative of a sixth value, and a second circular disc rotatably mounted in superimposed relation on said first circular disc concentrically thereof, said second circular disc having a diameter less than that of said scales on said first circular disc and including fixed indicator means disposed thereon so that said second circular disc may be rotated relative to said first circular disc to align said fixed indicator means with said sixth value scale to preserve the last sixth value reading made.

7. A portable computer as set forth in claim 6, wherein said base member is circular, and wherein said second circular disc includes a circular, equally spaced scale concentrically disposed thereon and being in the same ratio as said sixth value scale and being indicative of a seventh value, said seventh value scale beginning at said fixed indicator means and increasing in the same direction as said sixth value scale on said first circular disc so that when said fixed indicator means is aligned with a first predetermined sixth value then a seventh value representing the difference of a second sixth value and the first sixth value reading will be aligned with the second sixth value.

8. A portable computer, as set forth in claim 7, wherein said circular disc includes a circular, equally spaced, third scale concentrically disposed on the face thereof having said first and second scales and having predetermined units indicating distance readings, and further including a second circular disc rotatably mounted in superimposed relation on said first circular disc concentrically thereof, said second circular disc having a diameter less than that of said scales on said first circular disc and including fixed indicator means disposed thereon so that said second circular disc may be rotated relative to said first circular disc to align said fixed indicator means with a predetermined one of said units of said distance reading scale to preserve the last distance reading made.

9. A portable computer, as set forth in claim 8, wherein said second circular disc includes a circular, equally spaced scale concentrically disposed thereon and being in the same ratio as said distance reading scale and having predetermined units indicating distance traveled, said last-named scale beginning at said fixed indicator means and increasing in the same direction as said distance reading scale on said first circular disc so that when said fixed indicator means is aligned with a predetermined one of said units indicating the last distance reading then the one of said units indicating the total distance traveled on said last-named distance traveled scale will be aligned with the one of said units indicating the present distance reading on said distance reading scale.

10. A portable computer, specifically constructed for use by a motorist or the like comprising a substantially planar base member having opposed faces, one of said faces having a circular, logarithmically spaced scale thereon having predetermined units indicating total distance traveled, said base member also having an opening disposed therethrough inwardly of said total distance traveled scale and fixed indicator means on said other face in communication with said opening, a circular disc having opposed faces and being rotatably mounted at the center thereof in superimposed relation on said base member concentrically of said total distance traveled scale and having a diameter less than that of said total distance traveled scale, the face of said circular disc facing the same direction as said one face of said base member having a circular, logarithmically spaced scale concentrically disposed thereon in the same ratio as said total distance traveled scale and having predetermined units indicating total fuel consumed, said circular disc also having a circular, logarithmically spaced scale disposed on the other face thereof in communicating relationship with said opening in said base member, said last-named scale being in the same ratio as said total fuel consumed scale and having predetermined units indicating distance traveled per unit of fuel consumed and arranged so that when said circular disc is rotated relative to said base member with a total distance traveled unit aligned with a total fuel consumed unit then the corresponding unit of distance traveled per fuel consumed will be aligned in said opening with said fixed indicator means, and said predetermined units on said scale on said base member also being indicative of distance traveled per unit of time, and said circular disc including a circular, logarithmically spaced, second scale concentrically disposed on the face thereof having said total fuel consumed scale and being in the same ratio as said total distance traveled scale and having predetermined units indicative of time lapse and having an index so that when said circular disc is rotated relative to said base member with a total distance traveled unit aligned with a time lapse unit then the average distance traveled per unit of time will be aligned with the index of said time lapsed scale.

11. A portable computer as set forth in claim 10, wherein said circular disc includes a circular, equally spaced, third scale concentrically disposed on the face thereof having said first and second scales and having predetermined units indicating distance readings, and further including indicator means rotatably attached at the center of said circular disc and cooperating with said distance reading scale so that said indicator means may be positioned relative to said distance reading scale to preserve the last distance reading made.

12. A portable computer as set forth in claim 10, wherein said base member is circular.

13. A portable computer, specifically constructed for use by a motorist or the like comprising a substantially planar base member having opposed faces, one of said faces having a circular, logarithmically spaced scale thereon having predetermined units indicating total distance traveled, said base member also having an opening disposed therethrough inwardly of said total distance traveled scale and fixed indicator means on said other face in communication with said opening, a circular disc having opposed faces and being rotatably mounted at the center thereof in superimposed relation on said base member concentrically of said total distance traveled scale and having a diameter less than that of said total distance traveled scale, the face of said circular disc facing the same direction as said one face of said base member having a circular, logarithmically spaced scale concentrically disposed thereon in the same ratio as said total distance traveled scale and having predetermined units indicating total fuel consumed, said circular disc also having a circular, logarithmically spaced scale disposed on the other face thereof in communicating relationship with said opening in said base member, said last-named scale being in the same ratio as said total fuel consumed scale and having predetermined units indicating distance traveled per unit of fuel consumed and arranged so that when said circular disc is rotated relative to said base member with a total distance traveled unit aligned with a total fuel consumed unit then the corresponding unit of distance traveled per fuel consumed will be aligned in said opening with said fixed indicator means, said predetermined units on said scale on said base member also being indicative of distance traveled per unit of time, and said circular disc including a circular, logarithmically spaced, second scale concentrically disposed on the face thereof having said total fuel consumed scale and being in the same ratio as said total distance traveled scale and having predetermined units indicative of time lapse and having an index so that when said circular disc is rotated relative to said base member with a total distance traveled unit aligned with a time lapse unit then the average distance traveled per unit of time will be aligned with the index of said time lapsed scale, said circular disc further including a circular, equally spaced, third scale concentrically disposed on the face thereof having said first and second scales and having predetermined units indicating distance readings, and a second circular disc rotatably mounted in superimposed relation on said first circular disc concentrically thereof, said second circular disc having a diameter less than that of said scales on said first circular disc and including fixed indicator means disposed thereon so that said second circular disc may be rotated relative to said first circular disc to align said fixed indicator means with a predetermined one of said units of said distance reading scale to preserve the last distance reading made.

14. A portable computer, as set forth in claim 13, wherein said base member is circular and wherein said second circular disc includes a circular, equally spaced scale concentrically disposed thereon and being in the same ratio as said distance reading scale and having predetermined units indicating distance traveled, said last-named scale beginning at said fixed indicator means and increasing in the same direction as said distance reading scale on said first circular disc so that when said fixed indicator means is aligned with a predetermined one of said units indicating the last distance reading then the one of said units indicating the total distance traveled on said last-named distance traveled on said last-named distance traveled scale will be aligned with the one of said units indicating the present distance reading on said distance reading scale.

* * * * *